(12) United States Patent
Pilloff

(10) Patent No.: US 9,140,573 B2
(45) Date of Patent: Sep. 22, 2015

(54) PATH FINDING IN A MAP EDITOR

(75) Inventor: Mark D. Pilloff, San Jose, CA (US)

(73) Assignee: Google Inc., Mountain View, CA (US)

( * ) Notice: Subject to any disclaimer, the term of this patent is extended or adjusted under 35 U.S.C. 154(b) by 352 days.

(21) Appl. No.: 12/842,826

(22) Filed: Jul. 23, 2010

(65) Prior Publication Data

US 2015/0153193 A1    Jun. 4, 2015

(51) Int. Cl.
    *G08G 1/123*    (2006.01)
    *G01C 21/36*    (2006.01)
    *G01C 21/34*    (2006.01)

(52) U.S. Cl.
    CPC .................................. *G01C 21/3667* (2013.01)

(58) Field of Classification Search
    CPC .... G01C 21/32; G01C 21/28; G01C 21/3484; G01C 21/3697; G01C 21/3667; G01C 21/3694; G08G 1/096844; G08G 1/096827; G08G 1/096838; G08G 1/09675; G08G 1/096894; G06F 17/30241
    See application file for complete search history.

(56) References Cited

U.S. PATENT DOCUMENTS

| 6,192,314 | B1 * | 2/2001 | Khavakh et al. | 701/410 |
| 6,496,773 | B1 * | 12/2002 | Olsson | 701/117 |
| 7,263,438 | B2 * | 8/2007 | Furukawa | 701/533 |
| 7,439,878 | B2 * | 10/2008 | Kato et al. | 340/988 |
| 7,630,832 | B2 * | 12/2009 | Kim et al. | 701/425 |
| 7,660,667 | B2 * | 2/2010 | Furukawa | 701/420 |
| 8,650,193 | B1 * | 2/2014 | Pilloff | 707/737 |
| 2004/0052239 | A1 * | 3/2004 | Nesbitt | 370/349 |
| 2005/0093720 | A1 * | 5/2005 | Yamane et al. | 340/995.13 |
| 2006/0058950 | A1 * | 3/2006 | Kato et al. | 701/208 |
| 2006/0287815 | A1 * | 12/2006 | Gluck | 701/208 |
| 2008/0059055 | A1 * | 3/2008 | Geelen et al. | 701/201 |
| 2008/0243381 | A1 * | 10/2008 | Villalobos et al. | 701/211 |
| 2009/0088971 | A1 * | 4/2009 | Currie et al. | 701/209 |
| 2010/0318291 | A1 * | 12/2010 | Gluck | 701/208 |

* cited by examiner

*Primary Examiner* — Asfand Sheikh
*Assistant Examiner* — Dana Amsdell
(74) *Attorney, Agent, or Firm* — Fenwick & West LLP

(57) ABSTRACT

A system and method for automatically finding a path between two selected road segments. A map editor displays road segments in a visual map to a user. The user selects a beginning segment and an ending segment from the displayed segments. The map editor then identifies the best path between these two segments by applying a path-finding algorithm. The path finding algorithm identifies the best path based on the total length of the path and the changes in attributes between adjacent road segments in the path. The path identified by the map editor is then displayed to the user.

18 Claims, 5 Drawing Sheets

Before Path Identified

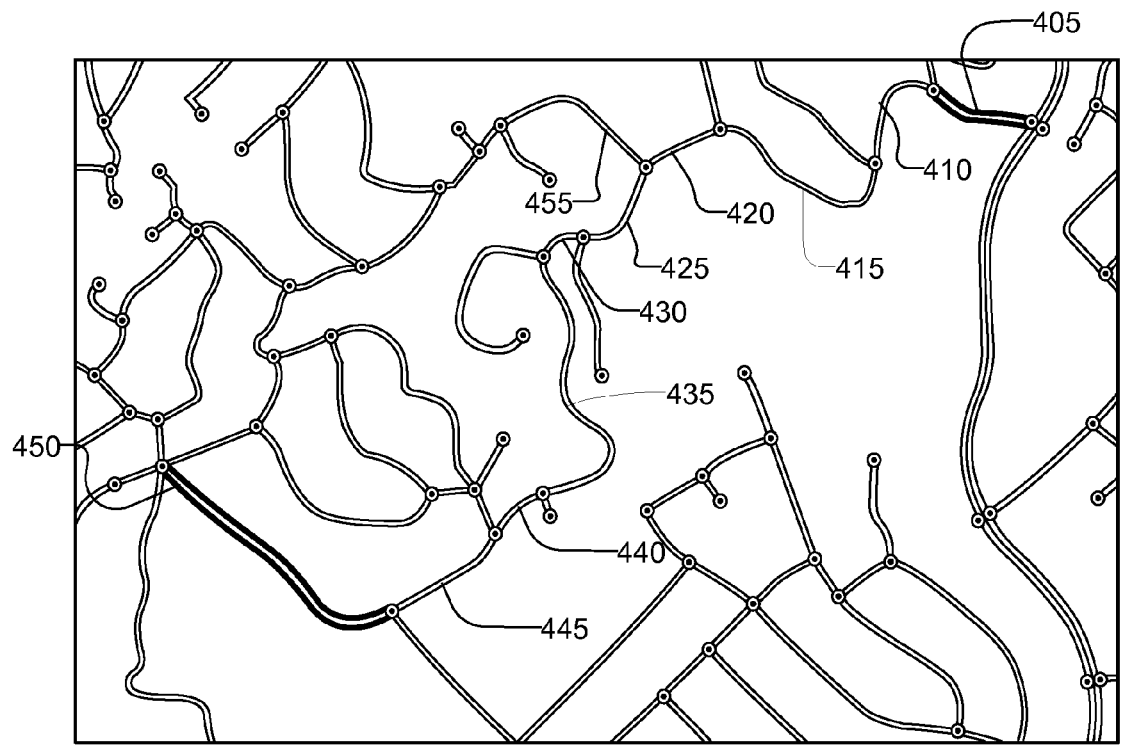
Before Path Identified FIG. 4a
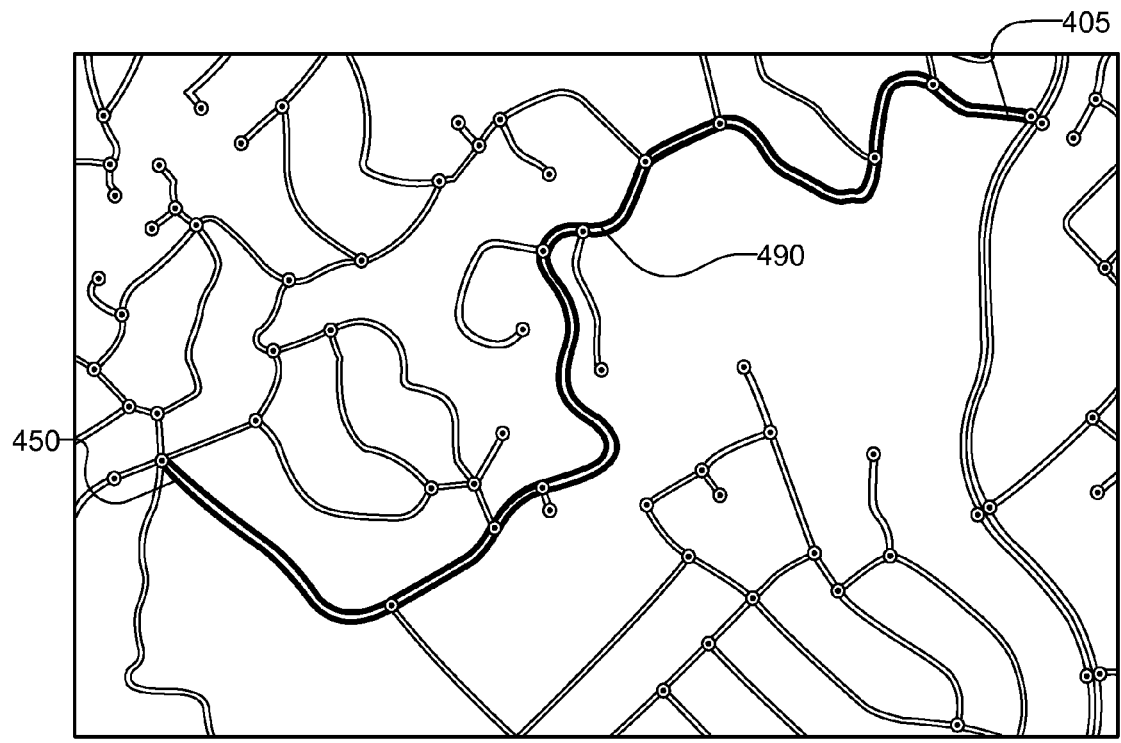
After Path Identified FIG. 4b

PATH FINDING IN A MAP EDITOR

FIELD OF THE INVENTION

The present invention relates to map editing and more specifically to a map editor configured for automatically finding a path between a pair of road segments.

BACKGROUND OF THE INVENTION

Digital maps are found in a wide variety of devices, including car navigation systems, hand-held GPS units, mobile phones, and in many websites such as GOOGLE MAPS and MAPQUEST. Although digital maps are easy to use from an end-user's perspective, creating a digital map is a difficult and time-consuming process. Every digital map begins with a set of raw data corresponding to millions of streets and intersections. The raw map data is derived from a variety of sources, each source providing different amounts and types of information. In many cases, data from different sources is inaccurate and out of date. Oftentimes the data from the different sources are in a format that is not suitable for use in a real map. Integrating data from these heterogeneous sources so that it can be used and displayed properly is an enormous challenge.

In particular, physical roads in the real world are represented in the raw data as a series of connected road segments. The data representation of each road segment includes a set of attributes, such as the street name, speed information, or the paved status of the segment. Some segments of a road may have missing or incomplete attribute data. To ensure consistency and completeness of the map data, it is important to be able to associate the same attribute with all the segments of a particular road or series of roads. However, using conventional map editors to edit such attributes is difficult because a single road can consist of many connected segments, each of which must be identified before its attributes can be modified.

One conventional technique for editing attributes involves selecting one road segment at a time. Thus, in order to apply the same attribute to a series of connected road segments, the user must individually select each road segment that needs to be edited. However, selecting road segments in this manner is extremely time consuming, especially if the user needs to apply the same set of attributes to a long road that has of hundreds of segments.

Another conventional technique for adding attributes involves selecting a group of road segments that are located within a certain area of a displayed map. This can be done, for example, by using the mouse to draw a box around an area of the map. However, this technique of selecting road segments is over-inclusive and results in too many road segments being selected. For example, the user may need to select a series of 30 connected segments that run diagonally through a particular area of a map that contains 900 road segments. By selecting all the segments within that area, the user is selecting not only the road segments with attributes that need to be modified, but also many other road segments with attributes that should not be modified.

SUMMARY OF THE INVENTION

A map editing system and method is configured to automatically find a path between two selected road segments. A map editor retrieves nodes and road segments from a database and displays them in a visual map to a user. The user selects a beginning segment and an ending segment from the displayed segments. The map editor then identifies the best path between these two segments by applying a path-finding algorithm. The path finding algorithm identifies the best path based on the length of the road segments in the path and changes in attributes between adjacent road segments in the path The path identified by the map editor is then displayed to the user. Additionally, the user can associate a common attribute with all of the segments in the identified path. In another embodiment, the user selects a beginning node and an ending node instead of a beginning segment and an ending segment, and the map editor identifies the best path between the nodes. As a result, the map editor can quickly identify a group of related road segments and edit them to have a set of common attributes.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 4a-4b illustrate the visual display of the map editor both before and after a path is identified.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

System Overview

Figure 1:
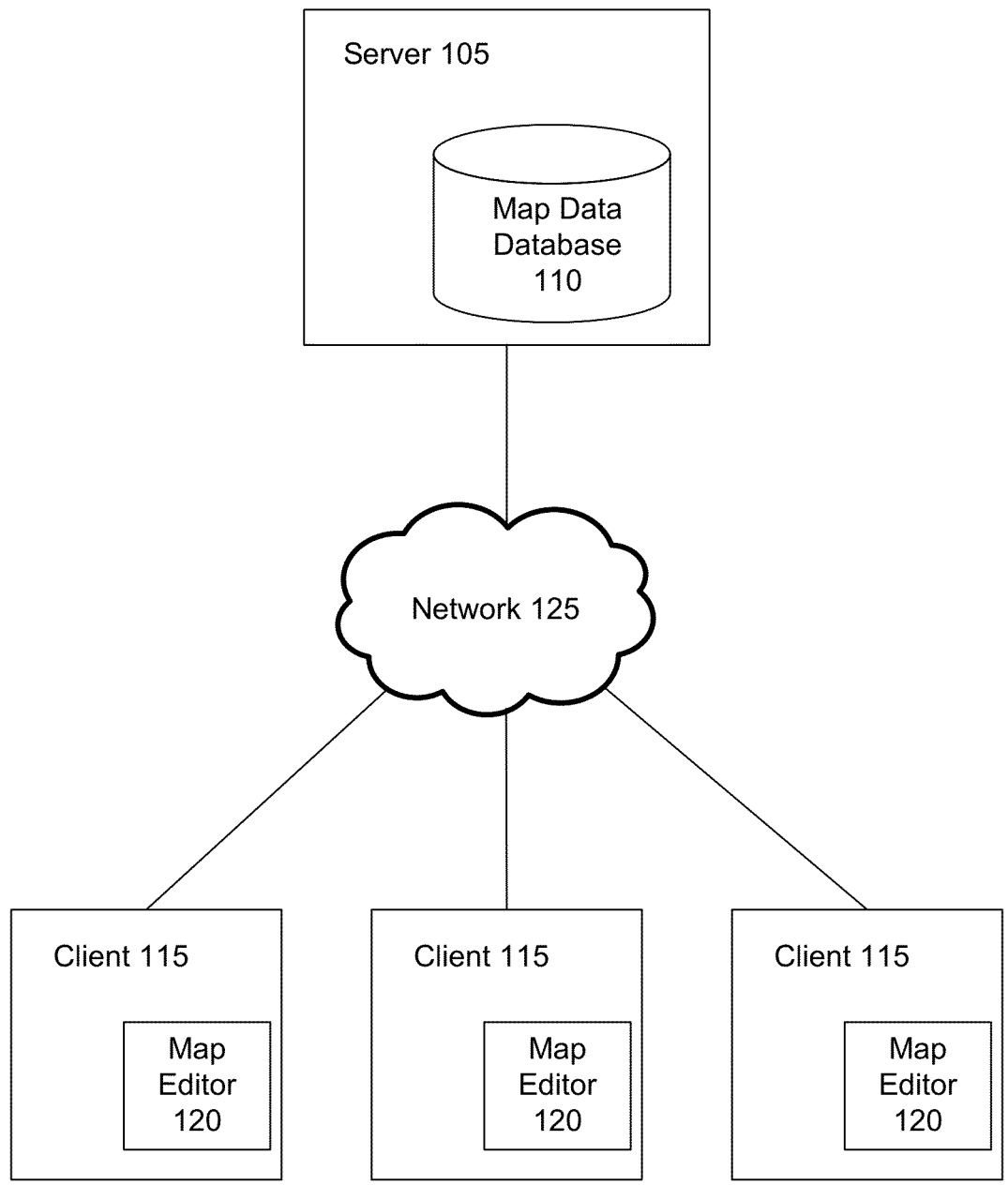
FIG. 1 is a high-level block diagram of a computing environment according to one embodiment.

FIG. 1 is a high-level block diagram that illustrates a computing environment for a map editor, according to one embodiment of the present disclosure. A shown in FIG. 1, the computing environment includes a server 105 connected to a number of client computers 115 through network 125. The network includes but is not limited to any combination of a LAN, MAN, WAN, mobile, wired or wireless network, a private network, or a virtual private network. While only three clients are shown to simplify and clarify the description, it is understood that very large numbers of client computers are supported and can be in communication with the server 105.

Both the server 105 and the clients 115 are computers that comprise a CPU, memory, network interface, peripheral interfaces, and other well known components. As is known to one skilled in the art, other types of computers can be used which have different architectures. The server 105 and the client 115 are also adapted to execute computer program modules for providing functionality described herein. As used herein, the term "module" refers to computer program logic used to provide the specified functionality. Thus, a module can be implemented in hardware, firmware, and/or software. In one embodiment, program modules are stored in on a storage device, loaded into memory, and executed by a processor or can be provided from computer program products that are stored in tangible computer-readable storage mediums (e.g. RAM, hard disk, or optical/magnetic media).

A map data database 110 is stored in server 105. The database 110 contains map data that can be used to generate a digital road map. Physical roads are represented in the map data by a list of nodes and road segments that connect those nodes. Each node corresponds to a specific geographic location in the physical world. The data representation for each node includes a set of coordinates (e.g. latitude and longitude) and an association with one or more road segments. Each road segment corresponds to a section of a physical road that begins at one node and ends at a different node. The data representation for each road segment can include a length and a number of attributes, such as street name, priority (e.g. highway or local road), speed information, surface type, road width, one-wayness, address ranges, usage (e.g. ramp or trail), etc. Further, some attributes of the road segment can be computed based on the information in the database. For example, the average angular direction of the road segment can be computed based on the coordinates of its beginning and ending nodes.

The map data can be obtained from several different sources such as the New York City Open Accessible Space Information System (OASIS) and the U.S. Census Bureau Topologically Integrated Geographic Encoding and Referencing system (TIGER). The map data can also be accessed by map editor 120, modified, and stored back into the database 110. Further, the database 110 does not need to be physically located within server 105. For example, the database can be placed within client 115, stored in external storage attached to server 105, or stored in network attached storage. Additionally, there may be multiple servers 105 that connect to a single database 110.

The client 115 executes map editor 120, which allows a user to modify the map data stored in map data database 110, for example in the process of creating a digital map. The map editor is configured to retrieve map data from database 110. The data is visually displayed to a user as a set of nodes and road segments connecting those nodes. The user selects beginning and ending segments. The map editor then identifies the best path between the two selected segments. The path is displayed to the user, who can attach the appropriate attributes to the segments in the path.

Path Finding with the Map Editor

Figure 2:
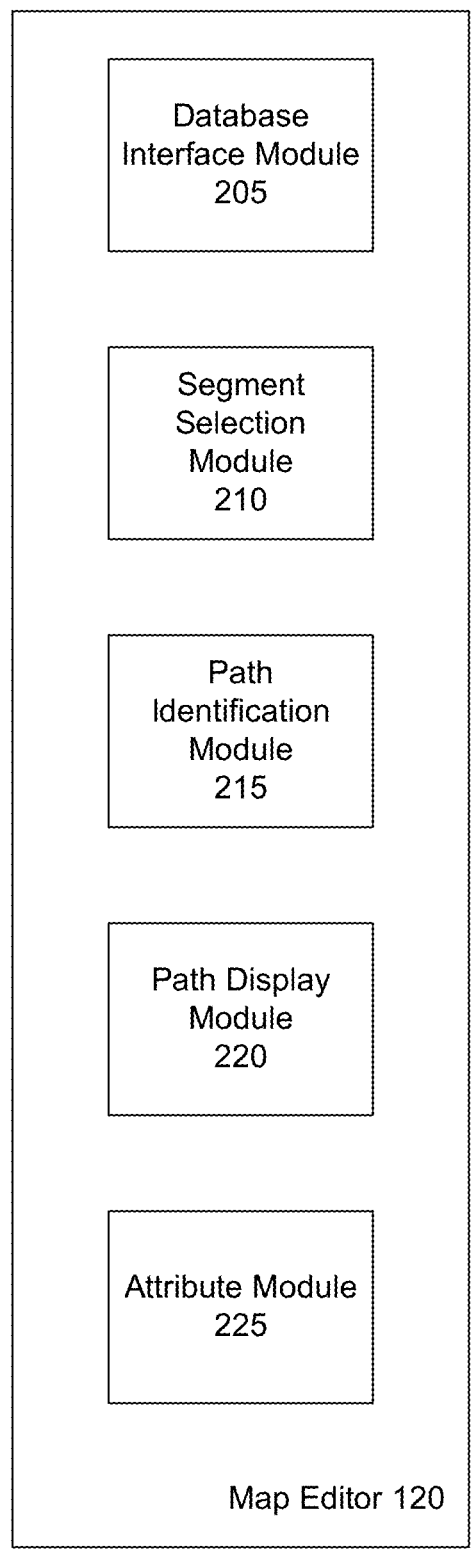
FIG. 2 is a high level block diagram illustrating modules within a map editor according to one embodiment.
Figure 3:
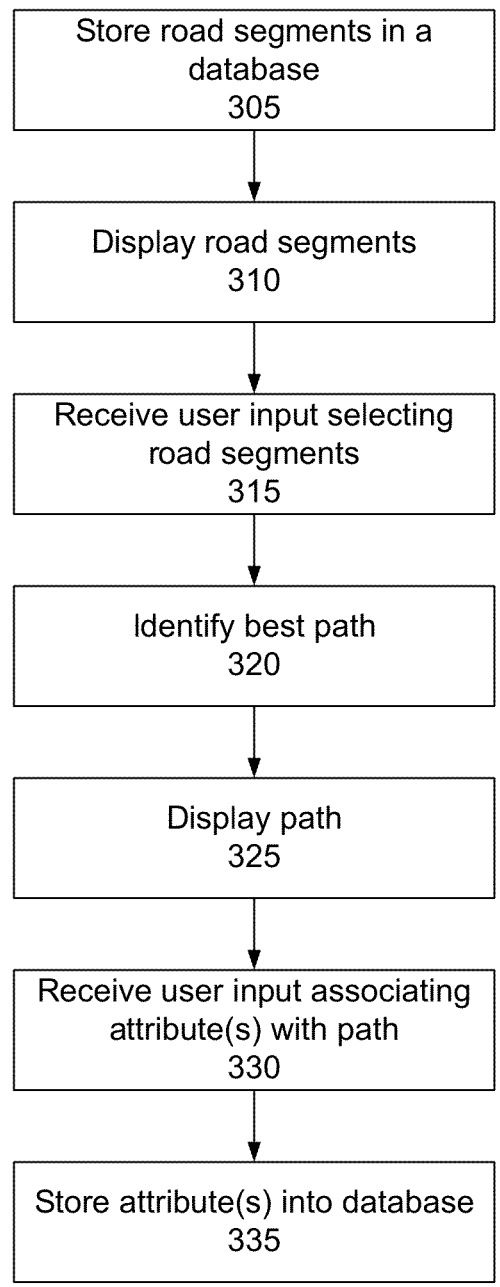
FIG. 3 is a process flow diagram for identifying a path between two road segments according to one embodiment.

Turning now to FIG. 2, illustrated is a high level block diagram illustrating modules within a map editor according to one embodiment. As illustrated, the map editor 120 includes a database interface module 205, a segment selection module 210, a path identification module 215, a path display module 220, and an attribute module 225. Some embodiments of the map editor 120 have different and/or other modules than the ones described herein. Similarly, the functions described herein can be distributed among the modules in accordance with other embodiments in a different manner than is described here. The detailed operation of these modules is explained below by reference to FIG. 3, which illustrates a process flow diagram for identifying a path between two road segments according to one embodiment.

The database interface module 205 stores 305 and retrieves map data to and from the database 110. As discussed above, physical roads in the real world are represented in the map data as nodes and road segments that connect those nodes. If a road segment shares a node with another road segment, then those two road segments are known as connected or adjacent road segments. Some longer roads may have hundreds or even thousands of connected road segments.

The segment selection module 210 displays 310 the nodes and road segments in the form of a visual map to a user. The segment selection module 210 then receives 315 a user input selecting a starting segment and an ending segment from amongst the displayed segments. The selected segments are separated by one or more connected road segments. The selected segments can also be emphasized in the display for ease of identification, such as with a different color or thicker lines. For example, referring to FIG. 4*a*, illustrated is a set of nodes and road segments as displayed in a visual map. The figure represents the map that is displayed after a user has selected two road segments, but before a path between the segments is identified. A number of road segments 405-455 are displayed in the map, along with many other un-labeled road segments. The user has selected a beginning segment 405 and an ending segment 450, both of which are emphasized in the display with dashed lines.

Next, the path identification module 215 automatically identifies the best path between the selected road segments. Because a map can contain millions of road segments, there may be multiple paths between any two selected road segments. For example, referring to FIG. 4*a*, one path between segment 405 and segment 450 consists of connected segments 410-445. However, an alternative path could include segments 410-420, 455, and other unlabeled road segments between 455 and 450. These are just two of the many possible paths that can connect segments 405 and 450.

The path identification module 215 identifies 320 the best path by applying a graph based path-finding algorithm that determines, among all paths satisfying a given set of constraints (e.g. specific starting and ending segments), the path that minimizes a given cost function. Exemplary path-finding algorithms include Dijkstra or A*. The detailed operation of these algorithms is well known in the art and will not be described here in detail. Generally speaking, path-finding algorithms find a path by starting at one point in a graph (e.g., a map) and repeatedly exploring adjacent routes to build a path until the destination point is reached. At each step in the exploration, the algorithm computes a total cost for following adjacent routes, where each segment in the currently built path contributes to the total cost based on its attributes. Typical path finding algorithms, for example, use the length of each road segment and/or travel time of each road as inputs to the cost function, and thus only minimize the total length of a path and/or the total travel time of the path. This limited approach may not in fact result in a path that is best from the perspective a person travelling along the path.

In one embodiment, the path identification module 215 determines a cost of a path by using the length of the connected road segments in the path and changes in the attributes between adjacent road segments in the path as inputs to a cost function. As the path-finding algorithm builds the path, it repeatedly computes the cost as each new road segment is added to the path. The length of each road segment can be retrieved from information in the database. Alternatively, the length of each road segment can approximated by computing the distance between the nodes of each road segment. The length of each road segment can be in any unit of measurement (e.g. meters, feet, or miles). The path identification module 215 identifies changes in attributes by comparing the attributes of each segment in the path to the attributes of the next connected segment in the path. The amount and type of change is represented by a "change factor." The attributes may be retrieved from the database (e.g. street name), or they may be computed from information in the database (e.g. angular direction). The road segment length and change factor are inputs to the cost function.

If there is a change in attributes from one segment to the next, the occurrence of the change itself can be represented by assigning a Boolean value to the change factor. For example, suppose the speed limit for one road segment is 50 mph and the speed limit for the next road segment is 55 mph. Because the speed limit has changed, the change factor is assigned a Boolean value of "1" to indicate that a change has occurred.

Where an attribute is categorical (e.g., type of road), then changes in the attribute can be represented by enumerated values for the change factor, where the enumerated value increases in direct proportion to the qualitative nature of the change in the attribute. For example, a change from a primary road to a secondary road can be represented by a value of 1, while a more significant change, from a primary road to a tertiary road, can be represented by a value of 2.

Where an attribute is numerical, then the magnitude of the difference in value between the attributes of one segment and the attributes of the next segment can be computed and used as the change factor. For example, suppose the speed limit for one road segment is 50 mph and the speed limit for the next road segment is 55 mph. The magnitude of the difference in value between the speed limits is 5, which is used as the change factor. The difference in values can be actual, absolute, normalized, standardized, and/or quantized as needed to best capture the range and variation in attributes.

The cost function applied by the path-finding algorithm can be any of a number of functions. The function may be a weighted sum of the segment lengths and the changes in attributes. The function can be a multiple of the segment lengths and the changes in attributes. Some changes in attributes may be ignored by the function unless they occur along with other changes in attributes. For example, a change in speed limit from one segment to the next may be ignored unless it is also accompanied by a change in the name of the road segments. The function may be a combination of these functions, or include other functions that are not described herein.

In one specific embodiment, the path identification module 215 applies the A* algorithm to find the minimum-cost path by using the length of segments in the path as well as a change factor based on changes in road name and angular direction between adjacent segments.

Generally speaking, the A* function is the sum of two functions, a path-cost function g(x) and a heuristic function h(x). In this embodiment, the path-cost function is represented by the following formula:

$$g(x) = \text{length} \times \text{bendfactor}$$

where g(x) is the path-cost function. Length is the total length of the path in meters. Bendfactor is an example of a change factor, and is computed with the following formula:

$$\text{bendfactor} = \min\left[1.5, \left(1 + \frac{K \times \text{bendiness}^2}{\text{length}}\right)\right]$$

where K is a constant in the range of 2-5. Length is the total length of the path. Bendiness is computed with the following formula:

$$\text{bendiness} = \sum_{i=1}^{N-1} \text{NameCh}_i \theta_i$$

where N is the number of connected segments, where NameCh has a Boolean value of 0 or 1 that corresponds to whether there is a change in name between segment i and segment i+1, and θ is the absolute value of the angular change in radians between segment i and segment i+1. Name changes and angular changes are evaluated N−1 times, once for each pair of connected segments in the path. In other words, bendiness is equal to the sum of the absolute values of the angular changes in radians between all pairs of connected segments with different names along a given path. Bendiness can also be computed in other forms (e.g., degrees), as well as in normalized or standardized values.

Figure 5:
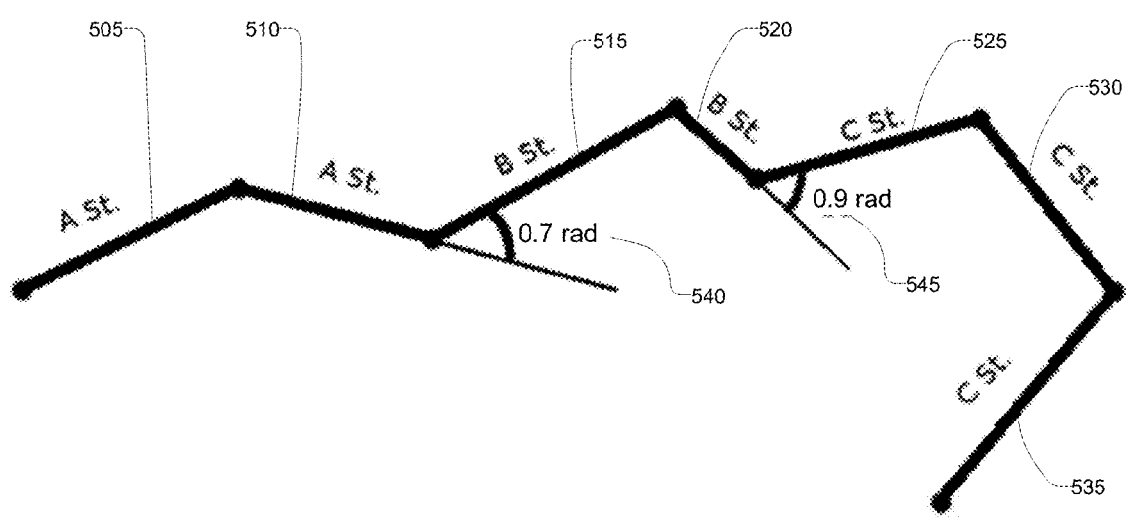
FIG. 5 illustrates a path of road segments with several changes in attributes.

For example, referring to FIG. 5, illustrated is a series of connected road segments in one particular path. The path has a beginning segment 505 and an ending segment 535. Using the above formula, a path-cost can be computed for this particular path. There are two changes in road names in this path. There is one change in road names between connected segments 510 and 515, and another between connected segments 520 and 525. The angular change 540 between segments 510 and 515 is 0.7 radians, and the angular change 545 between segments 520 and 525 is 0.9 radians, resulting in a bendiness of 1.6 radians. Length is equal to the combined length in meters of segments 505, 510, 515, 520, 525, 530, and 535. Assuming that each segment is 100 meters long, length is equal to 700 meters. A bendfactor is then computed based on this information. Assuming that K is set to 5, the bendfactor is equal to 1.018. The bendfactor is multiplied by length in order to compute the path-cost function. Here, the path cost g(x) is 713. Note that in this embodiment, the angular change between connected segments 515 and 520 does not affect the outcome of the bendiness calculation because both segments have the same road name.

As stated above, the path identification module 215 applies a path-finding algorithm that builds a path of connected segments between a starting segment and an ending segment. A cost function is repeatedly applied to the path as it is being built. The path-finding algorithm runs until it locates the lowest cost path that connects the selected segments. This path is then identified as the best path.

In another embodiment, the map editor receives a user input selecting a starting node and an ending node instead of a starting segment and an ending segment. The path-identification module 215 then identifies the best path between the nodes according to the above-described process.

Once the best path is identified, the path display module 220 displays 325 the identified path in a visual map. The identified path can be emphasized in the map, such as with different color or thicker lines. For example, FIG. 4b illustrates a visual road map displayed by the output module after a path is identified. The figure shows a beginning segment 405, an ending segment 450, and an identified path 490 between the two segments. The path 490 is also highlighted with broken red lines.

The attribute module 225 then receives 330 a user input associating one or more common attributes with each of the road segments in the identified path. For example, the user may determine that all the road segments in an identified path should be named "El Camino Real". As a result, the attributes module associates the name "El Camino Real" with each of the road segments in the path. The attributes are stored 335 into the database 110.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for identifying a path through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for map editing in a map editor, comprising:
    storing road segments in a computer database, each road segment having a length and attribute data describing features of the segment, a portion of the attribute data being incomplete;
    displaying the road segments on a map;
    receiving a user input selecting a first road segment from the road segments displayed on the map and receiving a user input selecting a second road segment from the road segments displayed on the map, the first road segment and the second road segment separated by one or more other road segments;
    identifying a path comprising a plurality of the road segments connecting the first and second segments by minimizing a cost based upon lengths of the road segments in the path and changes in one or more attributes between adjacent ones of the road segments in the path;
    displaying the identified path on the map;
    receiving, responsive to displaying the identified path, a user input associating a common attribute with each of the road segments in the identified path, wherein the common attribute is at least one of a road name, speed limit, surface type, road width, one-wayness or address range; and
    storing the common attribute in the computer database to modify the incomplete portion of the attribute data.

2. The method of claim 1, wherein minimizing a cost based on lengths of the road segments comprises minimizing a cost based on a total, combined length of the road segments.

3. The method of claim 1, wherein minimizing a cost based on changes in one or more attributes between adjacent ones of the road segments in the path comprises minimizing the cost based on respective changes in road name between the adjacent ones of the road segments.

4. The method of claim 1, wherein minimizing a cost based on changes in one or more attributes between adjacent ones of the road segments in the path comprises minimizing the cost based on respective changes angular direction between the adjacent ones of the road segments.

5. The method of claim 1, wherein minimizing a cost based on changes in one or more attributes comprises minimizing the cost based on respective changes between the adjacent ones of the road segments in at least one of the following attributes: priority, speed information, surface type, road width, one-wayness, address ranges, and usage.

6. The method of claim 1, wherein the one or more attributes comprise numerical attributes, and a change in a numerical attribute comprises a magnitude of a difference in the numerical values for the attribute between adjacent ones of the segments.

7. The method of claim 1, wherein the one or more attributes comprise categorical attributes, and a change in a categorical attribute comprises a Boolean value indicating the change in the categorical attribute between adjacent ones of the segments.

8. The method of 1, wherein minimizing a cost based upon lengths of the road segments in the path and changes in the one or more attributes between adjacent ones of the road segments in the path comprises minimizing a cost function based upon angular changes in direction between adjacent ones of the road segments that have different names, wherein angular changes between adjacent ones of the road segments having a common name do not affect the cost.

9. A non-transitory computer-readable medium storing instructions, the instructions when executed by a processor cause the processor to:
    store road segments in a computer database, each road segment having a length and attribute data describing features of the segment, a portion of the attribute data being incomplete;
    display the road segments on a map;
    receive a user input selecting a first road segment from the road segments displayed on the map and receiving a user input selecting a second road segment from the road segments displayed on the map, the first road segment and the second road segment separated by one or more other road segments;

identify a path comprising a plurality of the road segments connecting the first and second segments by minimizing a cost based upon lengths of the road segments in the path and changes in one or more attributes between adjacent ones of the road segments in the path;

display the identified path on the map;

receive, responsive to displaying the identified path, a user input associating a common attribute with each of the road segments in the identified path, wherein the common attribute is at least one of a road name, speed limit, surface type, road width, one-wayness or address range; and store the common attribute in the computer database to modify the incomplete portion of the attribute data.

10. A computer system for editing map data, comprising:

a processor; and a non-transitory computer readable medium storing instructions, the instructions when executed by the processor cause the processor to:

store road segments in a computer database, each road segment having a length and attribute data describing features of the segment, a portion of the attribute data being incomplete;

display the road segments on a map;

receive a user input selecting a first road segment from the road segments displayed on the map and receiving a user input selecting a second road segment from the road segments displayed on the map, the first road segment and the second road segment separated by one or more other road segments;

identify a path comprising a plurality of the road segments connecting the first and second segments by minimizing a cost based upon lengths of the road segments in the path and changes in one or more attributes between adjacent ones of the road segments in the path;

receive, responsive to displaying the identified path, a user input associating a common attribute with each of the road segments in the identified path, wherein the common attribute is at least one of a road name, speed limit, surface type, road width, one-wayness or address range; and store the common attribute in the computer database to modify the incomplete portion of the attribute data.

11. A computer-implemented method for map editing in a map editor, comprising:

storing nodes and road segments in a computer database, each road segment having a length and attribute data describing features of the segment, a portion of the attribute data being incomplete;

displaying the nodes and road segments on a map;

receiving a user input selecting a first node from the nodes displayed on the map and receiving a user input selecting a second node from the nodes displayed on the map, the first node and the second node separated by one or more of the road segments;

identifying a path comprising a plurality of the road segments connecting the first and second nodes by minimizing a cost based upon lengths of the road segments in the path and changes in one or more attributes between adjacent ones of the road segments in the path;

displaying the identified path on the map;

receiving, responsive to displaying the identified path, a user input associating a common attribute with each of the road segments in the identified path, wherein the common attribute is at least one of a road name, speed limit, surface type, road width, one-wayness or address range; and storing the common attribute in the computer database to modify the incomplete portion of the attribute data.

12. The method of claim 11, wherein minimizing a cost based on changes in one or more attributes between adjacent ones of the road segments in the path comprises minimizing the cost based on respective changes in road name between the adjacent ones of the road segments.

13. The method of claim 11, wherein minimizing a cost based on changes in one or more attributes between adjacent ones of the road segments in the path comprises minimizing the cost based on respective changes in angular direction between the adjacent ones of the road segments.

14. The method of 11, wherein minimizing a cost based upon lengths of the road segments in the path and changes in the one or more attributes between adjacent ones of the road segments in the path comprises minimizing a cost function based upon angular changes in direction between the adjacent ones of the road segments that have different names, wherein angular changes between adjacent ones of the road segments having a common name do not affect the cost.

15. A non-transitory computer-readable medium storing instructions, the instructions when executed by a processor cause the processor to:

store nodes and road segments in a computer database, each road segment having a length and attribute data describing features of the segment, a portion of the attribute data being incomplete;

display the nodes and road segments on a map;

receive a user input selecting a first node from the nodes displayed on the map and receiving a user input selecting a second node from the nodes displayed on the map, the first node and the second node separated by one or more of the road segments;

identify a path comprising a plurality of the road segments connecting the first and second nodes by minimizing a cost based upon lengths of the road segments in the path and changes in one or more attributes between adjacent ones of the road segments in the path;

display the identified path on the map;

receive, responsive to displaying the identified path, a user input associating a common attribute with each of the road segments in the identified path, wherein the common attribute is at least one of a road name, speed limit, surface type, road width, one-wayness or address range; and store the common attribute in the computer database to modify the incomplete portion of the attribute data.

16. A computer system for editing map data, comprising:

a processor; and a non-transitory computer readable medium storing instructions, the instructions when executed by the processor cause the processor to:

store nodes and road segments in a computer database, each road segment having a length and attribute data describing features of the segment, a portion of the attribute data being incomplete;

display the nodes and road segments on a map;

receive a user input selecting a first node from the nodes displayed on the map and receiving a user input selecting a second node from the nodes displayed on the map, the first node and the second node separated by one or more of the road segments;

identify a path comprising a plurality of the road segments connecting the first and second nodes by minimizing a cost based upon lengths of the road segments in the path and changes in one or more attributes between adjacent ones of the road segments in the path;

display the identified path on the map;

receive, responsive to displaying the identified path, a user input associating a common attribute with each of the road segments in the identified path, wherein the common attribute is at least one of a road name, speed limit, surface type, road width, one-wayness or address range; and store the common attribute in the computer database to modify the incomplete portion of the attribute data.

17. The method of claim 1, wherein the common attribute associated with each of the road segments in the identified path is the road name.

18. The method of claim 11, wherein the common attribute associated with each of the road segments in the identified path is the road name.

\* \* \* \* \*